(12) United States Patent
Blatt et al.

(10) Patent No.: US 9,699,660 B1
(45) Date of Patent: Jul. 4, 2017

(54) BIG DATA ANALYTICS FOR TELECOM FRAUD DETECTION

(71) Applicant: EMC Corporation, Hopkinton, MA (US)

(72) Inventors: Marcelo Blatt, Modiin (IL); Alon Kaufman, Herut (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 19 days.

(21) Appl. No.: 14/674,485

(22) Filed: Mar. 31, 2015

(51) Int. Cl.
*H04W 12/12* (2009.01)

(52) U.S. Cl.
CPC .................... *H04W 12/12* (2013.01)

(58) Field of Classification Search
CPC .............................. H04W 12/00; H04W 12/12
See application file for complete search history.

(56) References Cited

U.S. PATENT DOCUMENTS

| 5,351,290 A | 9/1994 | Naeini et al. |
| 5,602,906 A | 2/1997 | Phelps |
| 6,327,352 B1 | 12/2001 | Betts et al. |
| 8,359,006 B1 * | 1/2013 | Zang ................... H04M 3/2281 455/410 |
| 2004/0249866 A1 * | 12/2004 | Chen ................. G06F 17/30592 |

* cited by examiner

*Primary Examiner* — Marisol Figueroa
(74) *Attorney, Agent, or Firm* — BainwoodHuang

(57) ABSTRACT

Techniques of detecting telecom fraud involve applying a combination of real-time data analysis and risk models typically used in authentication applications to phone call metadata that is streamed to a database server on a continual basis to derive phone usage patterns as the database server receives the phone usage data. The database server then compares the derived phone usage patterns to patterns of fraudulent phone usage in order to detect SIM box or SIM cloning fraud in the streamed data. A comparison result that indicates the likelihood of such fraud in a vast set of phone calls may take the form of a risk score derived using risk models typically found in authentication applications.

11 Claims, 4 Drawing Sheets

BIG DATA ANALYTICS FOR TELECOM FRAUD DETECTION

BACKGROUND

Malicious subscribers of telecom services may attempt to commit telecom fraud in order to avoid legitimate charges or to make money from other, unsuspecting subscribers. Such telecom fraud may cost telecom service providers significant revenue and reduce the quality of the service provided to subscribers.

One type of telecom fraud is known as subscriber identity module (SIM) box fraud, a result of which is the theft of revenue that telecom service providers derive from international calls. In this case, a malicious subscriber intercepts calls in one country destined for another country into one end of a voice over IP (VoIP) network that bypasses a gateway through which telecom companies meter international calls. The malicious subscriber then has a SIM box connected to the other end of the VoIP network that poses as a cell phone on a telecom network in the other country to route the calls to their destination.

Another type of telecom fraud is known as SIM cloning, and involves the theft of identifying information of a SIM card belonging to a legitimate subscriber in order to fraudulently provide calls on a telecom network at the expense of the legitimate subscriber. A SIM card is a small memory module that contains, among other pieces of information, a unique serial number (ICCID) identifying that SIM card and an international mobile subscriber identity (ISMI) identifying a subscriber. These details are then input in new SIM cards to form SIM clones. A call made from a phone using a cloned SIM card may then be billed to the legitimate subscriber.

Conventional approaches to detecting telecom fraud involve manually analyzing individual subscriber accounts in order to establish fraudulent use of telecom services. For example, a subscriber who notices fraudulent charges on a bill may notify a telecom service provider of the charges. In response, an investigator with the telecom service provider examines calls associated with the charges to determine the type of fraud being perpetrated against the subscriber. The investigator may then study a larger pool of calls made using the telecom services to determine a source of that fraud.

SUMMARY

Unfortunately, there are deficiencies in the above-described conventional approaches. For example, telecom networks stream a huge amount of data (~4 TB of signaling data per hour). Manual analysis of individual calls through such a volume of data is unlikely to identify perpetrators of fraud within a reasonable amount of time.

In contrast with the above-described conventional approach, which is reactive and slow to detect fraud, improved techniques of detecting telecom fraud involve applying a combination of real-time data analysis and risk models typically used in authentication applications to phone call metadata that is streamed to a database server on a continual basis to derive phone usage patterns as the database server receives the phone usage data. The database server compares the derived phone usage patterns to patterns of fraudulent phone usage in order to detect SIM box or SIM cloning fraud in the streamed data. A comparison result that indicates the likelihood of such fraud in a vast set of phone calls may take the form of a risk score derived using risk models typically found in authentication applications.

Advantageously, the improved techniques are proactive and can detect telecom fraud as phone call metadata is streamed to the database server. By detecting fraudulent activity quickly within a vast amount of streaming data, losses due to such activity may be minimized or even prevented. Such real-time fraud detection is made possible through a combination of big-data analytical tools and authentication risk models that indicate a likelihood that a vast set of phone calls contain patterns of SIM box or SIM cloning fraud.

One embodiment of the improved techniques is directed to a method of detecting fraud in a telecommunications network. The method includes receiving, by a phone call database server, phone call metadata, the phone call metadata describing phone calls completed through phones over the telecommunications network. The method also includes performing, by the phone call database server, a data analytics operation on the received phone call metadata as the phone call metadata is received, the data analytics operation producing, as a result, patterns of phone calls completed through the phones. The method further includes comparing the patterns of phone calls made by the phones to specified patterns of fraudulent phone use to produce a comparison result, the comparison result indicating a likelihood that phone calls completed through at least one of the phones are fraudulent.

Additionally, some embodiments are directed to a phone call database server apparatus constructed and arranged to detect fraud in a telecommunications network. The apparatus includes a network interface, memory and controlling circuitry coupled to the memory. The controlling circuitry is constructed and arranged to carry out a method of detecting fraud in a telecommunications network.

Further, some embodiments are directed to a computer program product having a non-transitory, computer-readable storage medium which stores executable code, which when executed by a controlling circuitry, causes the controlling circuitry to detecting fraud in a telecommunications network.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques of detecting telecom fraud involve applying a combination of real-time data analysis tools and risk models typically used in authentication applications to phone call metadata that is streamed to a database server on a continual basis to derive phone usage patterns as the database server receives the phone usage data. Advantageously, the improved techniques are proactive and can detect telecom fraud as phone call metadata is streamed to the database server.

Figure 1:
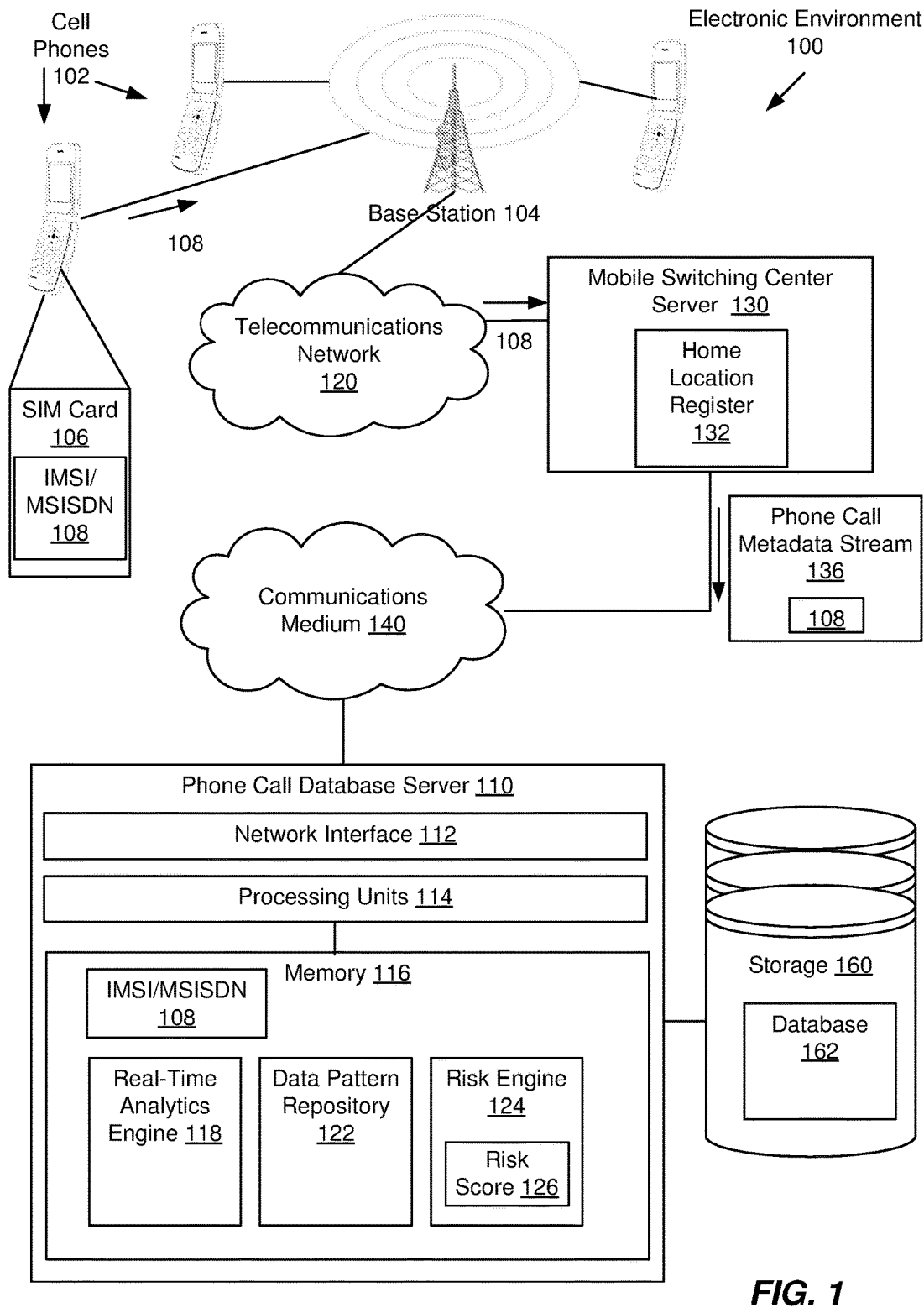
FIG. 1 is a block diagram illustrating an example electronic environment in which the improved technique can be carried out.

FIG. 1 shows an example electronic environment 100 in which embodiments of the improved techniques hereof can be practiced. The electronic environment 100 provides a coupling between a telecommunications network 120, which provides cell phone service, and a phone call database server 110 that determines whether fraudulent phone calls are being conducted within the telecommunications network 120. The electronic environment 100 includes a base station 104 and a mobile switching center server 130 each connected to the telecommunications network 120. The electronic environment 100 also includes a communications medium 140 that connects the mobile switching center server 130 to the phone call database server 110.

The base station 104 is one of several base stations configured to handle traffic and signaling between various cell phones 102 and the mobile switching center server 130 over the telecommunications network 120. Although base station 104 is depicted in FIG. 1 as an antenna that receives phone call data from phones 102 and transmits the phone call data to the mobile switching center server 130, base station 104 typically includes other equipment for encrypting and decrypting such communications, allocating radio frequencies to the communications, and other functions. It should be understood that typical, modern infrastructure for providing cell phone service contains other components not depicted in FIG. 1 but also not critical for the discussion of the improved techniques herein.

Cell phones 102 may be any type of phone authorized to use bandwidth provided by the telecommunications network 120 to conduct phone calls. The cell phones 102 present credentials for authorization in the form of identifiers stored in a SIM card 106. The SIM card 106 contains a pair of identifiers 108: an international mobile subscriber identity (IMSI) and a mobile subscriber ISDN (MSISDN), i.e., a phone number. The IMSI/MSISDN pair 108 is transmitted with other signals used to request cell phone services over the telecommunications network 120.

The telecommunications network 120 provides radio communications between various base stations, e.g., base station 104, and various mobile switching centers containing mobile switching center servers, e.g., mobile switching center server 130. The telecommunications network 120 is assumed to conform to the Global System for Mobile Communications (GSM) standard in the example under discussion.

The mobile switching center server 130 contains a home location register (HLR) 132. The HLR 132 is a central database that contains details of each mobile phone subscriber that is authorized to use the telecommunications network 120, as well as services requested by that subscriber. For example, the HLR 132 stores complete details of every SIM card issued by a service provider. Further, the HLR 132 stores the current position of a subscriber according to the particular mobile switching center through which the subscriber last attempted to request a connection to the telecommunications network 120. Thus, the HLR 132 may provide a rich set of metadata associated with each phone call.

The communications medium 140 provides network connections between mobile switching center server 130 and the phone call database server 130. The communications medium 140 may implement any of a variety of protocols and topologies that are in common use for communications over the internet. Further, the communications medium 140 may include various components (e.g., cables, switches/routers, gateways/bridges, etc.) that are used in such communications.

It should be understood that the communications medium 140 is illustrated in FIG. 1 as standing apart from the telecommunications network 120. However, in alternative arrangements, the communications medium 140 may be co-located with the telecommunications network 120.

The phone call database server 110 is a computer system that receives and stores continuously streaming phone call data, including phone call metadata 136 from the HLR 132, to carry out the improved techniques. The phone call database server 110 includes a network interface 112, processing units 114, a memory 116, and non-volatile storage 160. The network interface 112 includes, for example, adapters, such as SCSI target adapters and network interface adapters, for converting electronic and/or optical signals received from the communications medium 140 to electronic form for use by the phone call database server 110. The processing units 114 include one or more processing chips and/or assemblies. In a particular example, the processing units 114 include multi-core CPUs. The memory 116 includes both volatile memory (e.g., RAM), and non-volatile memory, such as one or more ROMs, disk drives, solid state drives, and the like. The processing units 114 and the memory 116 together form control circuitry, which is constructed and arranged to carry out various functions as described herein.

The memory 116 is also constructed and arranged to store various data, for example, metadata from stream 136 such as IMSI/MSISDN 108 and expressions of data patterns in data pattern repository 122. The memory 116 is further constructed and arranged to store a variety of software constructs realized in the form of executable instructions, such as real-time analytics engine 118 and risk engine 124. When the executable instructions are run by the processing units 114, the processing units 114 are caused to carry out the operations of the software constructs. Although certain software constructs are specifically shown and described, it should be understood that the memory 116 typically includes many other software constructs, which are not shown, such as an operating system, various applications, processes, and daemons, for example.

The real-time analytics engine 118 is configured to locate metadata in stream 136, as well as stored in storage 160, that satisfy data patterns stored in data pattern repository 122. It should be understood that, because data received by the phone call database server 110, including the metadata steam 136, may exceed 4 TB per hour (representing over 80,000 signaling events per second), the real-time analytics engine expresses algorithms that may quickly perform the sort of searching and sorting over such a lake of data in a short time. An example of such a data analytics engine is encapsulated in the Real Time Intelligence for Telecommunications (RTI4T) by Pivotal, a subsidiary of EMC Corp. of Hopkinton, Mass.

The risk engine 124 is configured to output a risk score from the values of any number of risk factors taken as input. In the discussion here, the risk engine 124 is adapted to take as factors values of metadata, or combinations of those values, that may or may not fit patterns of fraud stored in pattern repository 122. The risk engine 124 may also take as factors a behavioral history associated with a particular ISMI 108.

The storage 160 is provided, for example, in the form of hard disk drives and/or electronic flash drives. In some arrangements, the storage is organized in RAID groups, where each RAID group is composed of multiple disk drives. The storage 160 is constructed and arranged to store a database 162 for arranging metadata from stream 136, such as Greenplum provided by EMC Corp. of Hopkinton, Mass.

During an example operation, the phone call database server 110 receives a stream 136 of metadata over the communications medium 140 from the HLR 132. While it is assumed that the phone call database server 110 receives the stream 136 on a continuous basis, other arrangements are possible. It should be understood that the phone call metadata in the stream 136 contains data that describes phone calls. Such metadata includes the IMSI, the phone number (MSISDN), a location from where the phone calls were made, i.e., a switching center that received a call request, a begin and end time for each phone call, an indication of whether each call was incoming or outgoing, and the like.

At some point in time, e.g., upon receipt of a request to determine if fraud is being committed within the telecommunications network 120, the phone call database server 110 performs a data analytics operation on the stream of data 136. For example, an investigator with a telecommunications service provider might send a request to analyze incoming metadata for signs of SIM box fraud.

In response, the real-time analytics engine 118 performs a data analytics operation on the stream 136 of metadata and the database 162 as the phone call database server 110 is receiving the stream 136. For example, instructions contained in real-time analytics engine 118 cause the processing units 114 to execute a search for metadata in the database 132 that satisfies fraud patterns encapsulated in patterns stored in patterns repository 122. One example of such patterns includes suspicious ratios of outgoing calls to incoming calls associated with a single ISMI 108.

Once the real-time analytics engine produces data that fit specified fraud patterns, risk engine 124 considered these fraud patterns in light of historical phone call metadata stored in database 162. For example, the risk engine 124 takes as input values of risk factors including typical call times, phone numbers to which calls were made, and so on. Based on these values, the risk engine 124 outputs a risk score that indicates the likelihood that fraud is occurring within the telecommunications network 120.

Figure 2:
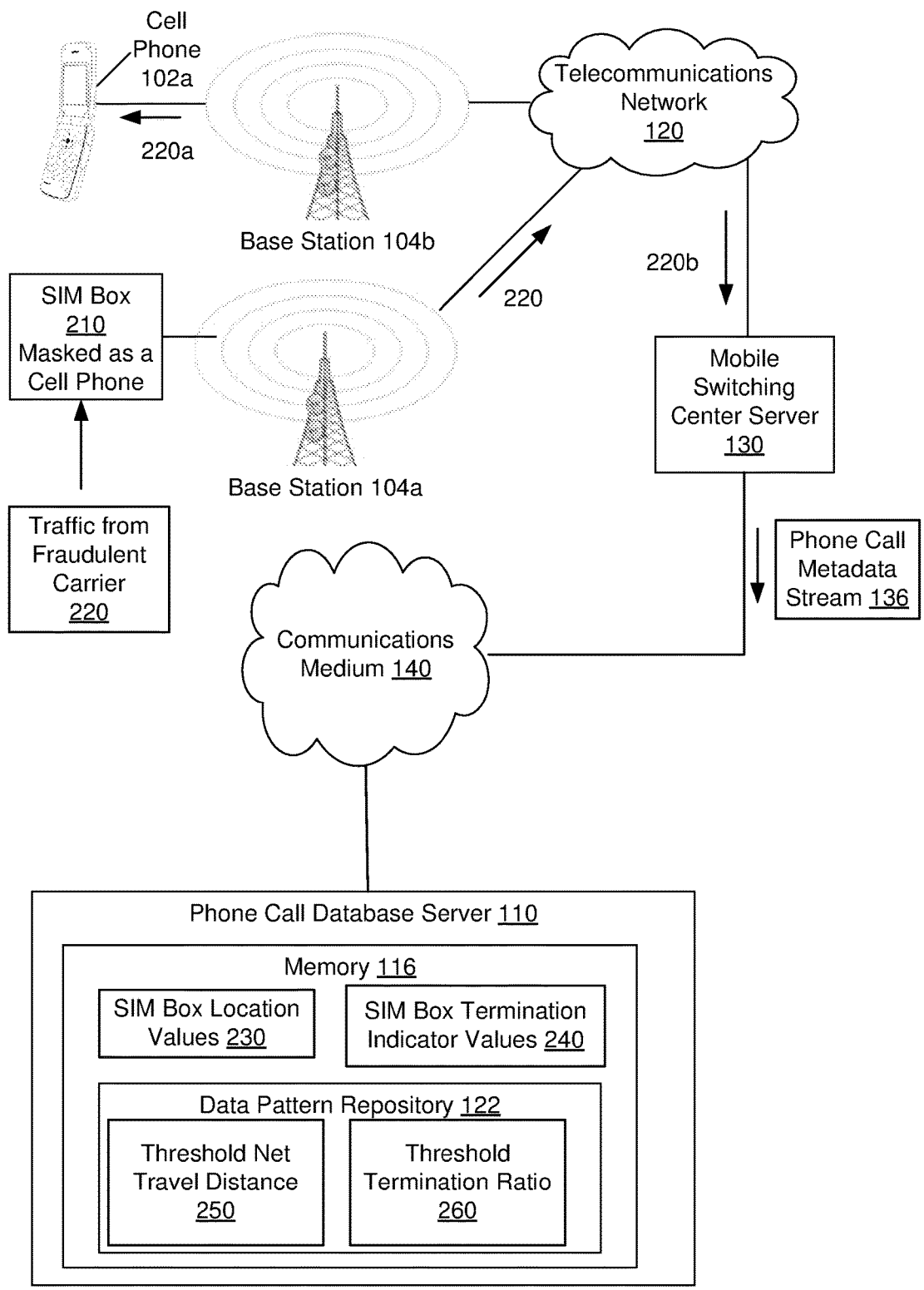
FIG. 2 is a block diagram illustrating an detection of SIM box fraud within the electronic environment illustrated in FIG. 1.

FIG. 2 illustrates the real-time fraud detection framework described above, but pertaining to SIM box fraud specifically. In FIG. 2, a SIM box 210 is shown receiving call traffic 220 that had been fraudulently routed around an international gateway. It should be understood that the SIM box 210 poses as a cell phone for the HLR 132. Thus, the SIM box 210 is associated with an IMSI and a phone number (MSISDN). For example, the SIM box then "initiates" a phone call to the phone 102a by routing the traffic 220 to the mobile switching center server 130 via base station 104a. In this case, the mobile switching center server 130 may reroute the call to the phone 102a via base station 104b by looking up the location of the IMSI associated with the phone 102a in the HLR 132.

It has been determined that patterns of data indicating SIM box fraud may be derived from factors including location of SIM box 210 during each phone call and whether each phone call is incoming or outgoing. For example, the SIM box 210 may make a large volume of outgoing local calls without changing its location significantly. It should be understood that other factors derived from metadata may also be importance to detecting SIM box fraud, and the example shown in FIG. 2 is for illustrative purposes.

To effect the detection of SIM box fraud as depicted in FIG. 2, the phone call database server 110 reads SIM box patterns from repository 122 as being expressed as a function of two factors associated with a phone call: (i) a termination indicator value (i.e., whether the call was outgoing or incoming) and (ii) a distance moved since the previous phone call.

The phone call database server 110 then searches through the metadata stream 136 and the database 162 for calls associated with a particular ISMI associated with the SIM box 210. For each phone call associated with the particular ISMI that was found by the phone call database server 110, the phone call database server computes (i) a ratio of outgoing calls to incoming calls and (ii) a net movement across all the found phone calls. It should be understood that the values used to compute these quantities are found in the metadata streamed from the HLR 132.

The phone call database server 110 then compares these values (i) and (ii) with values that have been found to indicate evidence of SIM box fraud. For example, a ratio of 10 outgoing calls to 1 incoming calls, or greater, may be one indication of SIM box fraud (e.g., because the SIM box is configured to receive a large amount of call traffic over a VoIP network). Further, zero net movement over many dozens of calls may also indicate SIM box fraud because the SIM box 210 is typically stationary, being connected to a VoIP network.

Further, in some arrangements, rather than concluding evidence of fraud based on the values of either or both of these two factors, the risk engine 124 takes in the values of the termination indicator and location for each found phone call associated with the particular ISMI. The risk engine may also take in other factors, such as historical behavior associated with the ISMI outside of this phone call metadata, such as when the ISMI established the MDISDN associated with the SIM box 210. Based on the input values of these factors, the risk engine outputs a risk score that indicates the likelihood that the subscriber associated the ISMI is operating a SIM box illegitimately. For a high enough risk score (e.g., higher than some threshold), the service provider may take remedial action against the subscriber.

Figure 3:
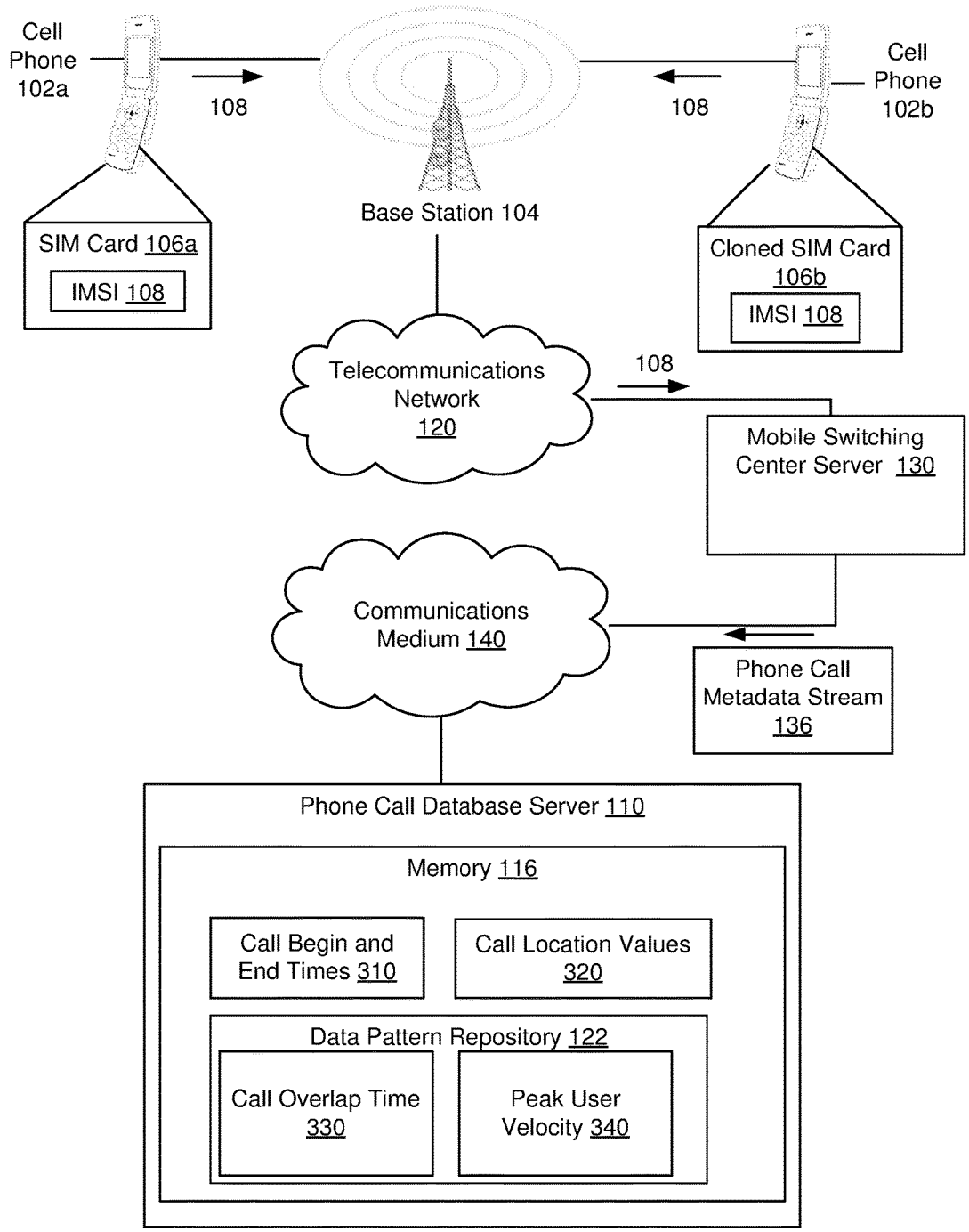
FIG. 3 is a block diagram illustrating an example detection of SIM cloning within the electronic environment illustrated in FIG. 1.

FIG. 3 illustrates the real-time fraud detection framework described above, but pertaining to SIM cloning fraud. In this scenario, a malicious actor steals information such as the IMSI 108 from the SIM card 106a of a subscriber authorized to conduct phone calls on the telecommunications network 120. Using this information, the malicious actor creates clones of the SIM card 106a, e.g., clone 106b. The malicious actor then may sell phones, e.g., phone 102b that use the cloned SIM card 106b. In this case, the "subscriber," unwittingly or not, may make phone calls over the telecommunications network 120 using the IMSI of the legitimate subscriber associated with the phone 102a. The legitimate subscriber is then stuck with the charges associated with calls made with phone 102b.

It has been determined that patterns of data indicating SIM cloning fraud may be derived from factors including the start and end times of each phone call associated with an ISMI 108 as well as the location of calls associated with the ISMI. For example, because the respective users of phones 102a and 102b will generally be unaware of each other and not necessarily near each other, calls that are close together—and certainly calls that are made simultaneously—may be suspect. (Some telecommunications networks may not allow simultaneous calls. In that case, times at which a call was attempted during another call may be of interest.) It should be understood that other factors derived from metadata may also be importance to detecting SIM cloning fraud, and the example shown in FIG. 3 is for illustrative purposes.

To effect the detection of SIM cloning fraud as depicted in FIG. 3, the phone call database server 110 reads SIM cloning patterns from repository 122 expressed as a function of three factors of a phone call associated with an ISMI: (i) start time of the call, (ii) end time of the call, and (iii) a location of the call.

The phone call database server 110 then searches through the metadata stream 136 and the database 132 and the database 162 for calls associated with the ISMI 108. For each phone call associated with the particular ISMI that was found by the phone call database server 110, the phone call database server computes (i) a call overlap time indicating how often calls completed through the particular phone and the second phone were being conducted close in time together and (ii) a peak user velocity indicating a maximum distance between the particular phone and the second phone as the particular phone and the second phone are conducting phone calls close together. It should be understood that the values used to compute these quantities are found in the metadata streamed from the HLR 132.

The phone call database server 132 then compares these values (i) and (ii) with values that have been found to indicate evidence of SIM cloning fraud. For example, calls that were made 30 seconds apart (e.g., the end time of a first call is 30 second before the begin time of a second call) from locations over a mile apart may be one indication of SIM cloning fraud (e.g., because the peak velocity one person would need to attain to cross that mile).

Further, in some arrangements, rather than concluding evidence of fraud based on the values of any of the three factors, the risk engine 124 takes in the values of the start time, end time, and location for each found phone call associated with the particular ISMI. The risk engine may also take in other factors, such as historical behavior associated with the ISMI outside of this phone call metadata, such as when the ISMI established the MDISDN associated with each phone 102a and 102b. Based on the input values of these factors, the risk engine outputs a risk score that indicates the likelihood that a subscriber's SIM card was cloned. For a high enough risk score (e.g., higher than some threshold), the service provider may take remedial action against the subscriber.

Figure 4:
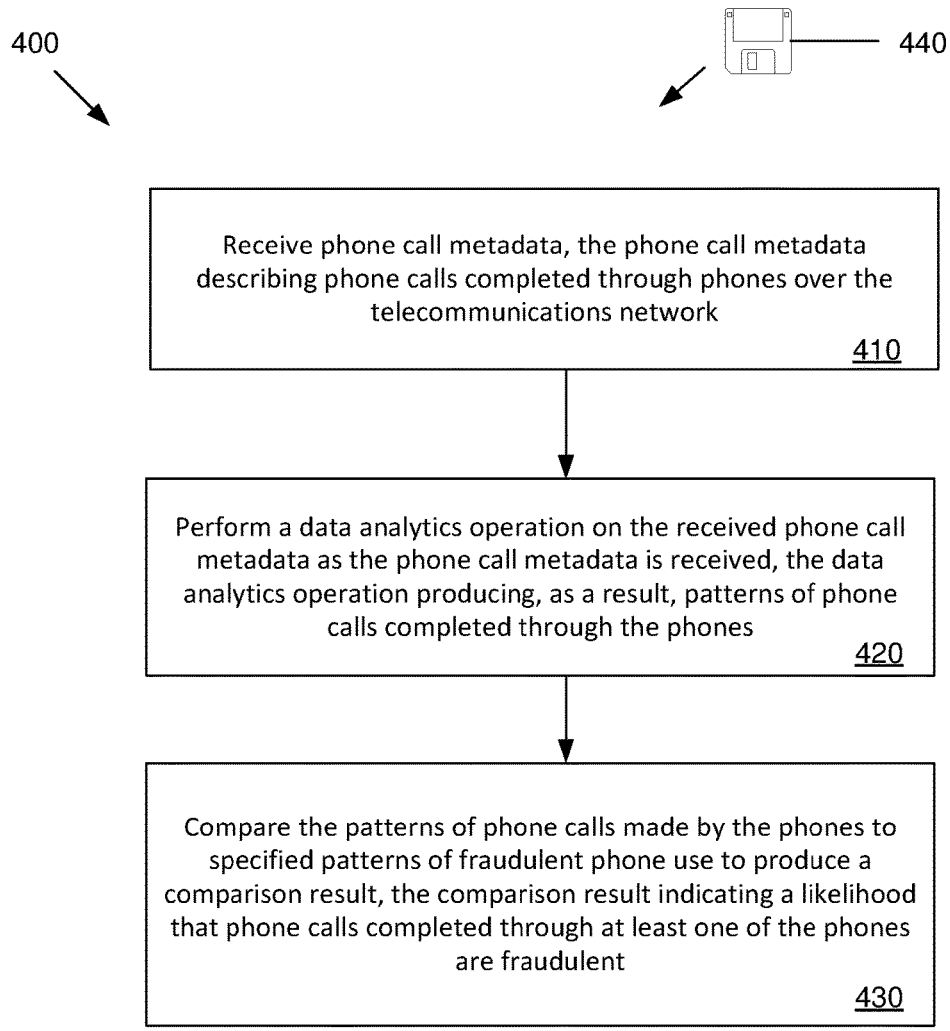
FIG. 4 is a flow chart illustrating a method of carrying out the improved technique within the electronic environment illustrated in FIG. 1.

FIG. 4 illustrates a method 400 of detecting fraud in a telecommunications network according to the improved techniques and provides a summary of some of the material presented above. The method 400 may be performed by the software constructs described in connection with FIGS. 1-3, which reside in the memory 116 of the phone call database server 110 and are run by the set of processing units 114.

At 410, phone call metadata is received by a phone call database server. The phone call metadata describes phone calls completed through phones over a telecommunications network. The metadata may include factors such as ISMI, call location, call start and end times, and termination indicator associated with each call, for example.

At 420, the phone call database server performs a data analytics operation on the received phone call metadata as the phone call metadata is received. The data analytics operation produces, as a result, patterns of phone calls completed through the phones. In some examples, such patterns may be encapsulated in combinations of values of the above-described factors, e.g., a ratio of outgoing to incoming phone calls.

At 430, the patterns of phone calls made by the phones are compared to specified patterns of fraudulent phone use to produce a comparison result. The comparison result indicates a likelihood that phone calls completed through at least one of the phones are fraudulent. In a simple example, the ratio of outgoing to incoming phone calls for a given ISMI being greater than 10 may indicate SIM box fraud. Moreover, such a ratio, or even the factors, may be input into a risk engine that computes a risk score indicating the likelihood of SIN box fraud.

Improved techniques of detecting telecom fraud involve applying a combination of real-time data analysis tools and risk models typically used in authentication applications to phone call metadata that is streamed to a database server on a continual basis to derive phone usage patterns as the database server receives the phone usage data. Advantageously, the improved techniques are proactive and can detect telecom fraud as phone call metadata is streamed to the database server.

Having described certain embodiments, numerous alternate embodiments or variations can be made. For example, the above examples pertained to a GSM telecommunications network. Other arrangements may pertain to networks that follow the CDMA standard.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 440 in FIG. 4). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:
1. A method of detecting fraud in a telecommunications network, the method comprising:
monitoring phone calls through phones of a telecommunication network in real time as the phone calls are made to generate phone call metadata;

receiving, by a phone call database server, the phone call metadata, the phone call metadata describing phone calls completed through phones over the telecommunications network;

performing, by the phone call database server, a data analytics operation on the received phone call metadata in real time as the phone call metadata is received, the data analytics operation producing, as a result, patterns of phone calls completed through the phones; and comparing the patterns of phone calls made by the phones to specified patterns of fraudulent phone use to produce a comparison result, the comparison result indicating a likelihood that a phone call completed through at least one of the phones are fraudulent, wherein the phone call metadata includes a user identifier associated with a phone through which a phone call was completed;

wherein performing the data analytics operation on the received phone call metadata includes producing a pattern of phone calls completed through a particular phone with which a particular user identifier is associated, wherein the comparison result produced by comparing the patterns of the phone calls completed through the phones to the specified patterns of fraudulent phone use further indicates a likelihood that phone calls made by the particular phone are fraudulent, wherein the phone call metadata further includes locations of a phone during each phone call completed through the phone;

wherein producing the pattern of phone calls completed through the particular phone includes generating a net distanced traveled by the particular phone between phone calls as the locations of the particular phone are received by the phone call database server;

wherein the specified patterns of fraudulent phone use indicate that the net distance traveled between fraudulent phone calls is less than a threshold distance.

2. A method as in claim 1, wherein the phone call metadata further includes a termination indicator value indicating whether a phone call completed through a phone is incoming or outgoing;

wherein producing the pattern of phone calls completed through the particular phone further includes generating a ratio of outgoing calls to incoming calls of the particular phone as the phone call metadata, including the termination indicator values, are received by the phone call database server;

wherein the specified patterns of fraudulent phone use further indicate that a ratio of outgoing calls to incoming calls is greater than a threshold termination ratio.

3. A method as in claim 2, further comprising generating, as the comparison result, a SIM (Subscriber Identity Module) box fraud risk score based on (i) the net distanced traveled by the particular phone between phone calls and (ii) the ratio of outgoing calls to incoming calls of the particular phone, the SIM box fraud risk score indicating a likelihood that the particular phone is involved in SIM box fraud.

4. A method as in claim 1, wherein the phone call metadata further includes (i) a call begin time and a call end time for each phone call and (ii) locations of each phone during each phone call completed through the phone;

wherein the user identifier associated with the particular phone is further associated with a second phone;

wherein producing the pattern of phone calls completed through the particular phone further includes generating, from the call begin times and the call end times for each of the particular phone and the second phone, (i) a call overlap time indicating how often calls completed through the particular phone and the second phone are being conducted close in time together and (ii) a peak user velocity indicating a maximum distance between the particular phone and the second phone as the particular phone and the second phone are conducting phone calls close together;

wherein the method further comprises generating, as the comparison result, a SIM (Subscriber Identity Module) cloning risk score based on the call overlap time and the peak user velocity, the SIM cloning risk score indicating a likelihood that the user identifier is involved in SIM cloning fraud.

5. A phone call database server apparatus for detecting fraud in a telecommunications network, the apparatus comprising:

a network interface;

memory; and controlling circuitry coupled to the memory, the controlling circuitry being constructed and arranged to:

monitoring phone calls through phones of a telecommunication network in real time as the phone calls are made to generate phone call metadata;

receive the phone call metadata, the phone call metadata describing phone calls completed through phones over the telecommunications network;

perform a data analytics operation on the received phone call metadata in real time as the phone call metadata is received, the data analytics operation producing, as a result, patterns of phone calls completed through the phones; and compare the patterns of phone calls made by the phones to specified patterns of fraudulent phone use to produce a comparison result, the comparison result indicating a likelihood that a phone call completed through at least one of the phones are fraudulent, wherein the phone call metadata includes a user identifier associated with a phone through which a phone call was completed;

wherein the controlling circuitry constructed and arranged to perform the data analytics operation on the received phone call metadata is further constructed and arranged to produce a pattern of phone calls completed through a particular phone with which a particular user identifier is associated;

wherein the comparison result produced by comparing the patterns of the phone calls completed through the phones to the specified patterns of fraudulent phone use further indicates a likelihood that phone calls made by the particular phone are fraudulent, wherein the phone call metadata further includes locations of a phone during each phone call completed through the phone;

wherein the controlling circuitry constructed and arranged to produce the pattern of phone calls completed through the particular phone is further constructed and arranged to generate a net distanced traveled by the particular phone between phone calls as the locations of the particular phone are received by the phone call database server;

wherein the specified patterns of fraudulent phone use indicate that the net distance traveled between fraudulent phone calls is less than a threshold distance.

6. An apparatus as in claim 5, wherein the phone call metadata further includes a termination indicator value indicating whether a phone call completed through a phone is incoming or outgoing;
 wherein the controlling circuitry constructed and arranged to produce the pattern of phone calls completed through the particular phone is further constructed and arranged to generate a ratio of outgoing calls to incoming calls of the particular phone as the phone call metadata, including the termination indicator values, are received by the phone call database server;
 wherein the specified patterns of fraudulent phone use further indicate that a ratio of outgoing calls to incoming calls is greater than a threshold termination ratio.

7. An apparatus as in claim 6, wherein the controlling circuitry is further constructed and arranged to generate, as the comparison result, a SIM (Subscriber Identity Module) box fraud risk score based on (i) the net distanced traveled by the particular phone between phone calls and (ii) the ratio of outgoing calls to incoming calls of the particular phone, the SIM box fraud risk score indicating a likelihood that the particular phone is involved in SIM box fraud.

8. An apparatus as in claim 5, wherein the phone call metadata further includes (i) a call begin time and a call end time for each phone call and (ii) locations of each phone during each phone call completed through the phone;
 wherein the user identifier associated with the particular phone is further associated with a second phone;
 wherein the controlling circuitry constructed and arranged to produce the pattern of phone calls completed through the particular phone is further constructed and arranged to generate, from the call begin times and the call end times for each of the particular phone and the second phone, (i) a call overlap time indicating how often calls completed through the particular phone and the second phone are being conducted close in time and (ii) a peak user velocity indicating a maximum distance between the particular phone and the second phone as the particular phone and the second phone are conducting phone calls close together;
 wherein the method further comprises generating, as the comparison result, a SIM (Subscriber Identity Module) cloning risk score based on the call overlap time and the peak user velocity, the SIM cloning risk score indicating a likelihood that the user identifier is involved in SIM cloning fraud.

9. A computer program product including a non-transitory, computer-readable storage medium which stores executable code, which when executed by a data storage system, causes the data storage system to perform a method of detecting fraud in a telecommunications network, the method comprising:
 monitoring phone calls through phones of a telecommunication network in real time as the phone calls are made to generate phone call metadata;
 receiving, by a phone call database server, the phone call metadata, the phone call metadata describing phone calls completed through phones over the telecommunications network;
 performing, by the phone call database server, a data analytics operation on the received phone call metadata in real time as the phone call metadata is received, the data analytics operation producing, as a result, patterns of phone calls completed through the phones; and
 comparing the patterns of phone calls made by the phones to specified patterns of fraudulent phone use to produce a comparison result, the comparison result indicating a likelihood that a phone call completed through at least one of the phones are fraudulent,
 wherein the phone call metadata includes a user identifier associated with a phone through which a phone call was completed,
 wherein performing the data analytics operation on the received phone call metadata includes producing a pattern of phone calls completed through a particular phone with which a particular user identifier is associated,
 wherein the comparison result produced by comparing the patterns of the phone calls completed through the phones to the specified patterns of fraudulent phone use further indicates a likelihood that phone calls made by the particular phone are fraudulent,
 wherein the phone call metadata further includes (i) a call begin time and a call end time for each phone call and (ii) locations of each phone during each phone call completed through the phone;
 wherein the user identifier associated with the particular phone is further associated with a second phone;
 wherein producing the pattern of phone calls completed through the particular phone further includes generating, from the call begin times and the call end times for each of the particular phone and the second phone, (i) a call overlap time indicating how often calls completed through the particular phone and the second phone are being conducted close in time and (ii) a peak user velocity indicating a maximum distance between the particular phone and the second phone as the particular phone and the second phone are conducting phone calls close together;
 wherein the method further comprises generating, as the comparison result, a SIM (Subscriber Identity Module) cloning risk score based on the call overlap time and the peak user velocity, the SIM cloning risk score indicating a likelihood that the user identifier is involved in SIM cloning fraud.

10. The method of claim 1, wherein receiving the phone call metadata includes receiving a continuous stream of metadata in real time over a communications medium coupled to a mobile switching center server.

11. The method of claim 10, wherein the mobile switching center server receives phone metadata from a telecommunications network conforming to the Global System for Mobile Communications (GSM) standard.

\* \* \* \* \*